United States Patent
Lee et al.

(10) Patent No.: US 9,178,212 B2
(45) Date of Patent: Nov. 3, 2015

(54) COMPOSITE ANODE ACTIVE MATERIAL, ANODE INCLUDING THE COMPOSITE ANODE ACTIVE MATERIAL, LITHIUM BATTERY INCLUDING THE ANODE, AND METHOD OF PREPARING THE COMPOSITE ANODE ACTIVE MATERIAL

(71) Applicant: Samsung Electronics Co., Ltd., Suwon-si, Gyeonggi-do (KR)

(72) Inventors: Jeong-Hee Lee, Yongin-si (KR); Jeong-Na Heo, Yongin-si (KR); Ho-Suk Kang, Yongin-si (KR); Sang-Kook Mah, Yongin-si (KR); In-Taek Han, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 114 days.

(21) Appl. No.: 14/078,144

(22) Filed: Nov. 12, 2013

(65) Prior Publication Data

US 2014/0070147 A1  Mar. 13, 2014

Related U.S. Application Data

(62) Division of application No. 12/696,435, filed on Jan. 29, 2010, now Pat. No. 8,608,983.

(30) Foreign Application Priority Data

Jan. 30, 2009 (KR) .......... 10-2009-0007521

(51) Int. Cl.
*H01B 1/04* (2006.01)
*B82Y 30/00* (2011.01)
(Continued)

(52) U.S. Cl.
CPC .............. *H01M 4/364* (2013.01); *H01M 4/366* (2013.01); *H01M 4/38* (2013.01); *H01M 4/40* (2013.01);
(Continued)

(58) Field of Classification Search
CPC ......... H01B 1/04; H01M 4/364; B82Y 30/00; B82Y 40/00
USPC .............. 252/500–519.1; 423/445 R, 445 B; 977/742, 777, 842, 900
See application file for complete search history.

(56) References Cited

U.S. PATENT DOCUMENTS

| 3,816,080 A * | 6/1974 | Bomford et al. ............... 75/233 |
| 2006/0134516 A1 | 6/2006 | Im et al. |

(Continued)

FOREIGN PATENT DOCUMENTS

| EP | 2208706 A1 * | 7/2010 | ............ D06M 11/83 |
| JP | 2004-220911 | 8/2004 | |

(Continued)

OTHER PUBLICATIONS

Dong ("An investigation of the sliding wear behavior of Cu-matrix composite reinforced by carbon nanotubes." Mat Sc Eng A, A313, pp. 83-87, 2001).*

(Continued)

*Primary Examiner* — Tri V Nguyen
(74) *Attorney, Agent, or Firm* — Stein IP, LLC

(57) ABSTRACT

A composite anode active material including metal core particles and carbon nanotubes that are covalently bound to the metal core particles, an anode including the composite anode active material, a lithium battery employing the anode, and a method of preparing the composite anode active material.

5 Claims, 2 Drawing Sheets

(51) Int. Cl.
*B82Y 40/00* (2011.01)
*H01M 4/36* (2006.01)
*H01M 4/38* (2006.01)
*H01M 4/40* (2006.01)
*H01M 4/485* (2010.01)
*H01M 4/587* (2010.01)
*H01M 10/0525* (2010.01)
*H01M 4/02* (2006.01)

(52) U.S. Cl.
CPC .............. *H01M 4/485* (2013.01); *H01M 4/587* (2013.01); *H01M 10/0525* (2013.01); *H01M 4/405* (2013.01); *H01M 2004/021* (2013.01); *Y02E 60/122* (2013.01)

(56) References Cited

U.S. PATENT DOCUMENTS

| | | | |
|---|---|---|---|
| 2007/0057415 A1* | 3/2007 | Katagiri et al. | 264/614 |
| 2007/0111102 A1 | 5/2007 | Inoue et al. | |
| 2007/0141315 A1* | 6/2007 | Sato et al. | 428/292.1 |
| 2008/0003503 A1 | 1/2008 | Kawakami et al. | |
| 2008/0038635 A1 | 2/2008 | Sheem et al. | |
| 2008/0062616 A1 | 3/2008 | Matsuda et al. | |
| 2008/0160409 A1 | 7/2008 | Ishida et al. | 429/220 |
| 2008/0261116 A1 | 10/2008 | Burton et al. | |
| 2009/0022652 A1 | 1/2009 | Sato et al. | |
| 2009/0117468 A1 | 5/2009 | Eom | |
| 2009/0169994 A1 | 7/2009 | Mah et al. | |
| 2010/0173228 A1 | 7/2010 | Wallace et al. | |
| 2011/0204281 A1* | 8/2011 | Rouse | 252/75 |

FOREIGN PATENT DOCUMENTS

| | | |
|---|---|---|
| JP | 2007-165079 | 6/2007 |
| KR | 10-2005-0074818 | 7/2005 |
| KR | 10-2007-0026699 A | 3/2007 |
| KR | 10-2007-0056765 | 6/2007 |
| KR | 10-2008-0071387 | 8/2008 |
| WO | WO 2007-074629 A1 | 7/2007 |

OTHER PUBLICATIONS

Suryanarayana ("Mechanical alloying and milling." Progress in Mater Sc, 46, pp. 1-184, 2001).*

U.S. Appl. No. 12/696,435, filed Jan. 29, 2010, Jeong-Hee Lee, Samsung Electronics Co., Ltd.

Korean Office Action mailed May 20, 2015, issued to the corresponding Korean Application No. 10-2009-0007521.

* cited by examiner

COMPOSITE ANODE ACTIVE MATERIAL, ANODE INCLUDING THE COMPOSITE ANODE ACTIVE MATERIAL, LITHIUM BATTERY INCLUDING THE ANODE, AND METHOD OF PREPARING THE COMPOSITE ANODE ACTIVE MATERIAL

CROSS-REFERENCE TO RELATED APPLICATION

This application is a divisional application of U.S. application Ser. No. 12/696,435, filed Jan. 29, 2010 in the U.S. Patent and Trademark Office, now U.S. Pat. No. 8,608,983, which claims the benefit of Korean Patent Application No. 10-2009-0007521, filed on Jan. 30, 2009, in the Korean Intellectual Property Office. All disclosures of the documents named above are incorporated herein by reference.

BACKGROUND

1. Field

One or more embodiments of the present teachings relate to a composite anode active material, an anode including the composite anode active material, a lithium battery employing the anode, and a method of preparing the composite anode active material.

2. Description of the Related Art

Carbonaceous materials such as graphite are representative examples of anode active materials for lithium batteries. Graphite has excellent electrical capacity retention characteristics and excellent voltage characteristics. In addition, graphite does not vary in volume when used to form an alloy with lithium, and thus, may increase the stability of a battery. Graphite has a theoretical electrical capacity of about 372 mAh/g and a high irreversible capacity.

In addition, metals capable of forming alloys with lithium may be used as an anode active material for lithium batteries. Examples of metals capable of forming alloys with lithium include silicon (Si), tin (Sn), aluminum (Al), and the like. These metals have a very high electrical capacity. For example, these metals may have an electrical capacity that is 10 times higher than that of graphite. Such metals undergo a change in volume during charging and discharging, thereby electrically isolating the active material within the electrode. In addition, an electrolyte decomposition reaction becomes severe, due to an increase in specific surface area of the active material. Si also has a relatively high resistance.

Metals capable of forming alloys with lithium may be formed into composites with carbonaceous materials, in order to suppress volumetric expansion and improve conductivity. However, conventional examples of such composite materials rely only on Van der Waals forces for cohesion, and thus, the metal and the carbonaceous material are easily separated during charging and discharging. Thus, there is a demand for a high-capacity and long-lifespan active material for high-capacity lithium batteries.

SUMMARY

One or more embodiments of the present teachings include a composite anode active material having a novel structure.

One or more embodiments of the present teachings include an anode including the anode active material.

One or more embodiments of the present teachings include a lithium battery employing the anode.

One or more embodiments of the present teachings include a method of preparing the composite anode active material.

According to one or more embodiments of the present teachings, a composite anode active material includes metal core particles; and carbon nanotubes covalently bound to the metal core particles, so that the carbon nanotubes and the metal core particles are integrally formed as one body.

According to one or more embodiments of the present teachings, an anode includes the composite anode active material.

According to one or more embodiments of the present teachings, a lithium battery includes the anode.

According to one or more embodiments of the present teachings, a method of preparing a composite anode active material includes: preparing a mixed solution by mixing metal core particles, carbon nanotubes, and an organic solvent; milling the mixed solution; drying the milled mixed solution; and sintering the dried product in an inert gas atmosphere.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the teachings will become apparent and more readily appreciated from the following description of the exemplary embodiments, taken in conjunction with the accompanying drawings, of which.

DETAILED DESCRIPTION

Figure 1:
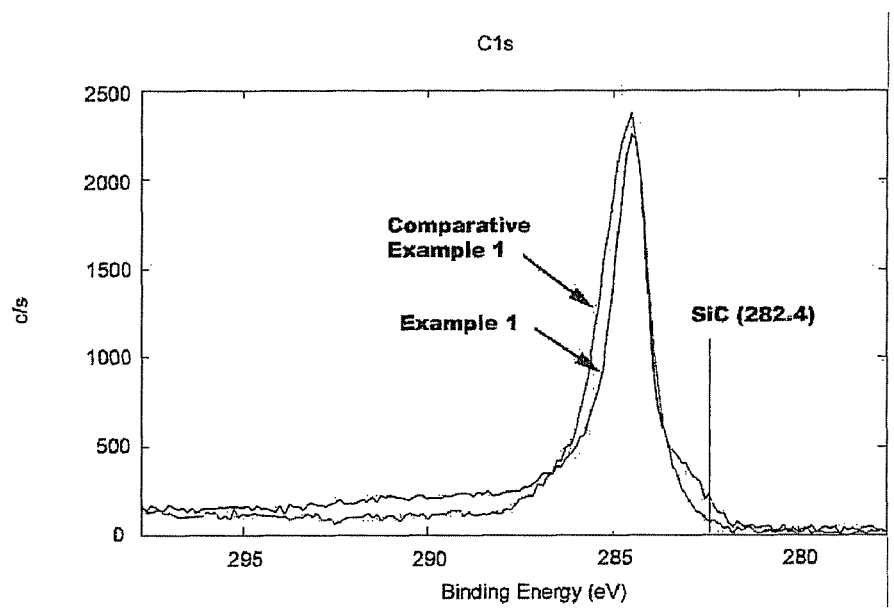
FIG. 1 illustrate X-ray photoelectric spectra of composite anode active materials prepared according to Example 1 and Comparative Example 1.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

One or more exemplary embodiments of the present teachings include a composite anode active material including metal core particles and carbon nanotubes covalently bound to the metal core particles, so that the carbon nanotubes and metal core particles are formed as a single body. Since the metal core particles and the carbon nanotubes are bound by covalent bonds, the metal core particles are not separated and isolated from the carbon nanotubes in a battery, even when the volume of the metal core particles varies during charging and discharging of the battery. Thus, a lithium battery including the composite anode active material may have an increased capacity and retention rate. Thus, the lifespan thereof is increased. In addition, since the composite anode active material includes carbon nanotubes that have a high electrical conductivity, electrons migrate easily within the composite anode active material. Furthermore, in spite of the metal core particles having a relatively high resistance, a reduction in efficiency of the battery may be prevented.

According to an exemplary embodiment, the metal core particles of the composite anode active material may include a metal capable of forming alloy with lithium. The metal may be any suitable metal that may be used as an anode active material. These metals may include silicon (Si), tin (Sn), aluminum (Al), germanium (Ge), lead (Pb), bismuth (Bi), antimony (Sb), and alloys thereof. Alternatively, the metal core particles may include a metal oxide capable of forming an alloy with lithium. In this regard, the metal core particles may include a vanadium oxide, lithium oxide, or the like.

According to an exemplary embodiment, the metal core particles may have an average particle diameter of 50 nm or less. For example, the metal core particles may have an average particle diameter of from about 20 to about 25 nm. If the metal core particles are non-spherical, the average particle diameter refers to the smallest diameter of a particle.

According to an exemplary embodiment, the carbon nanotubes may be crystalline carbon nanotubes. The carbon nanotubes may have a D/G value of about 0.2 or less, which is a value obtained from the Raman spectra thereof and is obtained using Equation 1 below. For example, the carbon nanotubes may have a D/G value of from about 0.1 to about 0.15.

$$D/G = \text{Peak intensity of } D \text{ band/Peak intensity of } G \text{ band} \quad \text{<Equation 1>}$$

If the D/G value is greater than about 0.2, the crystallinity of the carbon nanotubes is relatively low, so that lithium ions are more liable to irreversibly react with the carbon nanotubes during charging and discharging. Thus, the carbon nanotubes contribute to a lower reversibility efficiency.

According to an exemplary embodiment, the amount of the carbon nanotubes in the composite anode active material may be in a range of from about 2% to about 20% by weight, based on the total weight of the composite anode active material.

According to an exemplary embodiment, the composite anode active material may not have a metal/carbon bulk phase, such as an SiC bulk phase. The absence of the metal/carbon bulk phase refers to the composite anode active material that includes substantially no other carbonaceous material phase, except for carbon nanotubes (CNT).

According to an exemplary embodiment, the composite anode active material may further include oxygen. The amount of oxygen may be 25% by weight or less, based on the total weight of the composite anode active material. The amount of oxygen may be in a range of from about 1% to about 25% by weight, based on the total weight of the composite anode active material.

According to an exemplary embodiment, the composite anode active material may further include a metal oxide capable of forming an alloy with lithium. The metal oxide may be represented by Formula 1, as follows:

$$MO_y \quad \text{<Formula 1>}$$

In Formula 1, M includes at least one metal selected from the group consisting of silicon (Si), aluminum (Al), germanium (Ge), lead (Pb), bismuth (Bi), tin (Sn), and alloys thereof, where $0.4 \leq y \leq 0.6$. For example, the metal oxide may be $SiO_{0.5}$.

One or more exemplary embodiments include an anode including the composite anode active material. For example, the anode may be manufactured by molding an anode active material composition including the composite anode active material and a binder, into a desired shape, or coating the mixed anode material on a current collector, such as copper foil, or the like.

In particular, the anode active material composition is prepared, and then the mixed anode material composition may be directly coated on a copper foil current collector, to obtain an anode plate. Alternatively, the anode active material composition may be cast on a separate support, and then an anode active material film separated from the support is laminated on a copper foil current collector, to obtain an anode plate. The anode is not limited to the examples described above, and may be one of a variety of types.

For high capacity batteries, it is necessary to charge and discharge a large amount of current, and thus, a material having low electrical resistance may be used. Any suitable conducting agent that reduces the resistance of an electrode may be added to the anode. In this regard, the conducting agent may be carbon black, graphite particulates, or the like. Alternatively, the anode active material composition may be printed on a flexible electrode substrate, to manufacture a printable battery.

Figure 3:
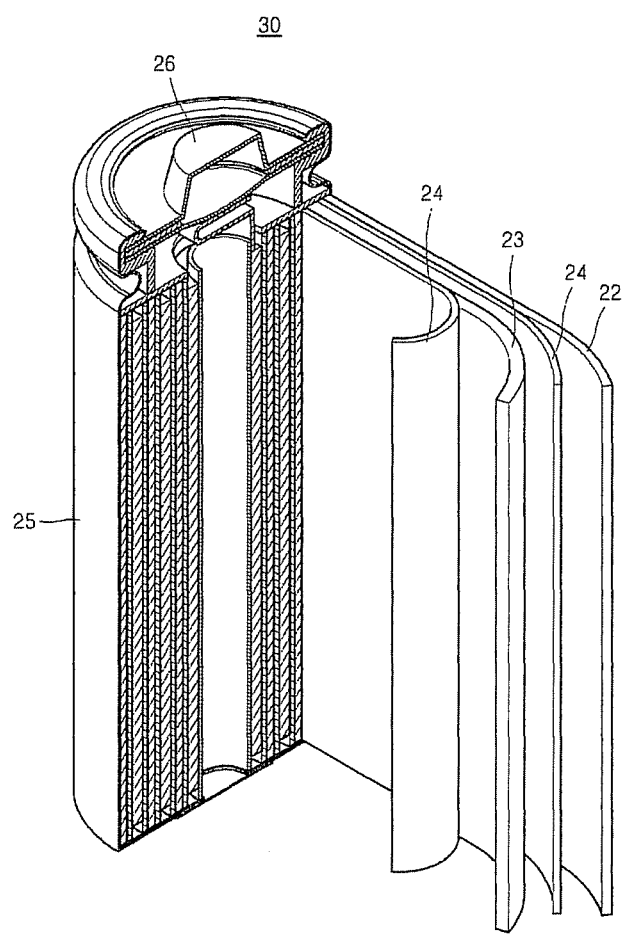
FIG. 3 illustrates a perspective view of a lithium secondary battery, according to aspects of the present disclosure.

FIG. 3 is a schematic perspective view of a lithium secondary battery 30, according to an exemplary embodiment of the present teachings. Referring to FIG. 3, the lithium battery 30 includes a cathode plate 23, an anode plate 22, a separator 24 disposed between the cathode plate 23 and the anode plate 22, an organic electrolyte solution (not shown), a battery container 25, and a sealing member 26 to seal the battery container 25.

One or more exemplary embodiments include a lithium battery employing the anode. The lithium battery may be manufactured in the following manner.

First, a cathode active material, a conducting agent, a binder, and a solvent are mixed to prepare a cathode active material composition. The cathode active material composition is directly coated on a metallic current collector and then dried, to prepare a cathode plate. Alternatively, the cathode active material composition may be cast on a separate support, and then a cathode active material film separated from the support is laminated on a metallic current collector, to prepare a cathode plate.

Any lithium-containing metal oxide that is commonly used in the art may be used as the cathode active material. Examples of the lithium-containing metal oxide include $LiCoO_2$, $LiMn_xO_{2x}$ where x=1 or 2, $LiNi_{1-x}Mn_xO_2$ where $0<x<1$, or $LiNi_{1-x-y}Co_xMn_yO_2$ where $0 \leq x \leq 0.5$ and $0 \leq y \leq 0.5$. Specific examples of the lithium-containing metal oxide include compounds capable of the intercalation and deintercalation of lithium ions, such as, $LiMn_2O_4$, $LiCoO_2$, $LiNiO_2$, $LiFeO_2$, $V_2O_5$, TiS, MoS, or the like. The conducting agent may include carbon black or a graphite particulate. Examples of the binder include a vinylidene fluoride/hexafluoropropylene copolymer, polyvinylidene fluoride (PVDF), polyacrylonitrile, polymethylmethacrylate, polytetrafluoroethylene, mixtures of these materials, and a styrene butadiene rubber polymer. The solvent may include N-methyl-pyrrolidone, acetone, water, or the like. Here, the amounts of the cathode electrode active material, the conducting agent, the binder, and the solvent are amounts generally used in the art.

A separator used in the lithium battery may be any separator that is commonly used for lithium batteries. The separator may have low resistance to the migration of ions in an electrolyte and may have an excellent electrolyte-retaining ability. Examples of the separator may include glass fiber, polyester, polyethylene, polypropylene, a fluoropolymer such as polytetrafluoroethylene (PTFE), and a combination thereof. The separator may be in non-woven or woven fabric form. In particular, a woundable separator including polyethylene, polypropylene, or the like, may be used. A separator that retains a large amount of an organic electrolytic solution may be used. The separator may be manufactured using the following method.

A polymer resin, a filler, and a solvent are mixed to prepare a separator composition. The separator composition is directly coated on an electrode and then dried, to form a separator film. Alternately, the separator composition may be cast onto a separate support, dried, detached from the separate support, and then finally laminated on an upper portion of the electrode, thereby forming a separator film.

The polymer resin may be any polymer resin that is commonly used for binding electrode plates in lithium batteries. Examples of the polymer resin may include a vinylidenefluoride/hexafluoropropylene copolymer, polyvinylidene fluoride (PVDF), polyacrylonitrile, polymethylmethacrylate, and a mixture thereof.

An electrolytic solution used in the lithium battery is prepared by dissolving an electrolyte in a solvent. The solvent may be selected from the group consisting of propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, and mixtures thereof. The electrolyte may be a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are each independently a natural number, LiCl, LiI, or mixtures thereof.

The separator 24 is interposed between the cathode plate 23 and the anode plate 22, and the resultant is wound or folded to form an electrode assembly. The electrode assembly is encased in the battery container 25. The battery container 25 is shown as being cylindrical, but may also be rectangular in some aspects. The organic electrolyte solution is then injected into the battery container 25, thereby forming the lithium ion battery 30.

Alternatively, the electrode assembly is formed as a laminated bi-cell structure, which is impregnated with the organic electrolytic solution. The electrode assembly is put into a pouch, which is then sealed, thereby forming a lithium ion polymer battery.

One or more exemplary embodiments of the present teachings include a method of preparing a composite anode active material, the method including: preparing a mixed solution, by mixing metal core particles, carbon nanotubes, and an organic solvent; milling the mixed solution; drying the milled mixed solution; and sintering the dried product in an inert gas atmosphere.

The mixed solution is prepared by mixing metal core particles, carbon nanotubes, and an organic solvent. The mixed solution is milled using a miller, at a rotation rate of from about 50 to about 55 Hz, for from about 1 to about 2 hours, followed by drying the resultant product. Next, the dried product is sintered at a temperature of from about 700 to about 1400° C., for from about 1 to 4 hours, thereby obtaining the composite anode active material. The metal core particles and the carbon nanotubes form a composite during the milling process. Covalent bonds are formed between the metal core particles and the carbon nanotubes, during the sintering process. The mill used for the milling process may be a bead mill, a high-energy milling apparatus, or the like.

According to an exemplary embodiment, the amount of the carbon nanotubes in the mixed solution may be in a range of from about 2% to about 20% by weight, based on the total weight of the metal core particles and the carbon nanotubes.

According to an exemplary embodiment, the amount of oxygen in the organic solvent molecule may be about 25% by weight or less, based on the total molecular weight of the organic solvent molecule. For example, the organic solvent may include a C4-C20, straight or branched, alcohol. In this regard, the organic solvent may include butanol, octanol, or the like.

According to an exemplary embodiment, the sintering process may be performed at a temperature of from about 600° C. to about 1400° C. For example, sintering process may be performed at a temperature of from about 600° C. to about 900° C.

Hereinafter, one or more embodiments of the present teachings will be described in detail, with reference to the following examples. However, these examples are not intended to limit the scope of the present teachings.

Preparation of Anode Active Material

Example 1

Silicon (Si) powder (High Purity Chemicals Co., Japan) having an average particle diameter of 4 nm and carbon nanotubes (CVD-SWCNT 601CE, Carbon Nanotechnologies Inc., USA) were mixed at a weight ratio of 9:1. 6 g of the mixture was added to 200 ml of 1-octanol constituting a solvent, to prepare a mixed solution. The mixed solution was placed in a bead mill (Ultra Apex Mill UAM-015, Kotobuki Ind. Co.) and milled at a rotation rate of 55 Hz, at room temperature, for 2 hours. The solvent of the milled mixed solution was evaporated in an oven, at a temperature of 80° C., and then thermally treated at 800° C. in a nitrogen atmosphere, for 2 hours, thereby obtaining a composite anode active material.

Comparative Example 1

Silicon (Si) powder (High Purity Chemicals Co., Japan) having an average particle diameter of 4 nm and carbon nanotubes (CVD-SWCNT 601CE, Carbon Nanotechnologies Inc., USA) were mixed at a weight ratio of 9:1. 6 g of the mixture was added to 200 ml of 1-octanol, constituting a solvent, to prepare a mixed solution. The mixed solution was placed in a bead mill (Ultra Apex Mill UAM-015, Kotobuki Ind. Co.) and milled at a rotation rate of 55 Hz, at room temperature, for 2 hours. Next, the solvent of the milled mixed solution was evaporated in an oven, at temperature of 80° C.

Comparative Example 2

A composite anode active material was prepared in the same manner as in Comparative Example 1, except that the milling time was 1 hour.

Comparative Example 3

A composite anode active material was prepared in the same manner as in Comparative Example 1, except that ethanol was used as the organic solvent, and the milling time was 1 hour.

Reference Example 1

Carbon nanotubes (CVD-SWCNT 601CE, Carbon Nanotechnologies Inc., USA) were used as received for Raman spectroscopy.

Manufacture of Anode and Lithium Battery

Example 2

55% by weight of the composite anode active material, in powder form, prepared in Example 1 and 30% by weight of a carbonaceous conducting agent (SFG6, Timcal Inc.), in dried form, were mixed in an agate mortar, and then mixed with 15% by weight of a 5 wt % polyvinylidene fluoride (PVDF) solution, in N-methylpyrrolidone, to obtain a slurry. The slurry was coated on a Cu current collector using a doctor blade, to a thickness of 100 μm, dried at 90° C. for 1 hour, and then dried again at 120° C. in a vacuum, for 2 hours. Next, the dried slurry was subjected to a rolling process until the thickness of the dried slurry, initially deposited to a thickness of 50 nm, reached 30 nm, thereby obtaining an anode plate.

The anode plate, a lithium metal constituting a counter electrode, a polypropylene layer (Cellgard 3510) constituting a separator, and an electrolyte solution obtained by dissolving 1.3 M of $LiPF_6$ in a mixed solvent of ethylene carbonate (EC) and diethylene carbonate (DEC) (volume ratio of 3:7) were used to manufacture a CR-2016 standard coin cell.

Comparative Examples 4 Through 6

Lithium batteries were manufactured in the same manner as in Example 2, except that the anode active materials of Comparative Examples 1, 2, and 3 were used instead of the composite anode active material of Example 1.

Evaluation Example 1

XPS (X-Ray Photoelectron Spectroscopy) Analysis

XPS analysis was performed on the composite anode active material powders prepared in Example 1 and Comparative Example 1. The results are shown in FIG. 1. As can be seen in FIG. 1, a shoulder corresponding to Si—C covalent bonds was identified near 282.4 eV, in the XPS spectra of the composite anode active material of Example 1. However, for the composite anode active material of Comparative Example 1, no shoulder appeared.

Evaluation Example 2

Measurement of Raman Spectrum

Figure 2:
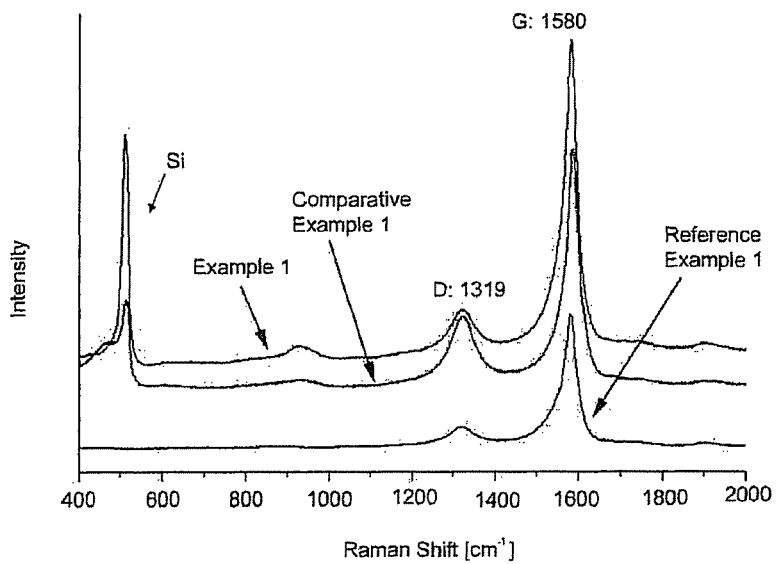
FIG. 2 illustrates Raman spectra of the composite anode active materials prepared according to Example 1, Comparative Example 1, and Reference Example 1.

Raman spectrum analysis was performed on the composite anode active material powders of Example 1 and Comparative Example 1, and the carbon nanotubes of Reference Example 1, and the results are shown in FIG. 2 and Table 1 below.

TABLE 1

|  | D/G |
|---|---|
| Example 1 | 0.15 |
| Comparative Example 1 | 0.30 |
| Reference Example 1 | 0.15 |

As shown in Table 1, the composite anode active material of Example 1 had a smaller D/G value, which was obtained using Equation 1 below, than the composite anode active material of Comparative Example 1. The D/G value of the composite anode active material of Example 1 corresponds to the D/G value of the pure carbon nanotubes of Reference Example 1. Therefore, it can be confirmed that, in comparison to the composite anode active material of Comparative Example 1, which includes amorphous carbon, the composite anode active material of Example 1 includes a negligible amount of amorphous carbon.

$$D/G = \text{Peak intensity of } D \text{ band/Peak intensity of } G \text{ band} \quad \text{<Equation 1>}$$

Evaluation Example 3

X-Ray Diffraction Test

An X-ray diffraction test was performed on the composite anode active materials prepared in Example 1 and Comparative Examples 1, 2 and 3, at $\lambda=1.54184$ Å, in order to measure full maximum at half width (FMHW) and θ values. Then, the particle size of Si was calculated from the FMHW and θ values, using Scherrer's equation (Equation 2 below). The results are shown in Table 2 below. The two particle diameters in Table 2 for each of the composite anode active materials of Example 1 and Comparative Examples 1, 2, and 3 were calculated from two 2θ values respectively measured on the planes (111) and (220), which denote Miller indices (hkl).

$$\text{Particle diameter} = \lambda/[\text{FWHM} \cos \theta] \quad \text{<Equation 2>}$$

TABLE 2

|  | FWHM | 2θ | Particle diameter (nm) |
|---|---|---|---|
| Example 1 | 0.3928 | 28.44176 | 23.2 |
|  | 0.4674 | 47.33073 | 20.6 |
| Comparative Example 1 | 0.4157 | 28.46004 | 21.9 |
|  | 0.4605 | 47.35474 | 20.9 |
| Comparative Example 2 | 0.3132 | 28.49615 | 29.1 |
|  | 0.3697 | 47.38030 | 26.1 |
| Comparative Example 3 | 0.6305 | 28.43590 | 14.5 |
|  | 0.6789 | 47.33582 | 14.2 |

As can be seen in Table 2, for the composite anode active material of Example 1, the Si metal core particles had a particle diameter of from about 20 to about 25 nm.

Evaluation Example 4

Composition Analysis

The amounts of elements constituting the composite anode active material of Example 1 were analyzed using an ion coupled plasma (ICP) analyzer (ICP-AES on Shimadzu ICPS-8100 sequential spectrometer) and a CNS (carbon/nitrogen/sulfur) analyzer (Flash EA 1112, Thermo Electron corporation, USA). The percentage of oxygen was calculated by subtracting the proportions of the elements from 100%. The results are shown in Table 3 below.

TABLE 3

| Example 1 | Si | O | C | N | H |
|---|---|---|---|---|---|
| Amount [wt %] | 69.1 | 21.1 | 9.4 | 0.3 | 0.1 |

The amount of oxygen in the composite anode active material was less than 25%. Considering the amount of oxygen in the composite anode active material on a mole basis, the silicon oxide can be represented by $SiO_{0.54}$.

Evaluation Example 5

Charge-Discharge Test

The lithium batteries manufactured according to Example 2 and Comparative Examples 4 through 6 were charged until the voltage thereof reached 0.0V (with respect to the Li metal), by a current of 100 mA per 1 g of the composite anode active material, and then discharged at the same rate, until the voltage reached 1.5V (with respect to the Li metal). Then, the cycle of charging and discharging was repeated 12 times. The results are shown in Table 4 below. An initial discharge capacity refers to a discharge capacity at the $1^{st}$ cycle. An initial coulombic efficiency refers to a ratio of discharge capacity to charge capacity at the $1^{st}$ cycle (Coulombic efficiency=Discharge capacity/Charge capacity). A capacity retention rate at the $10^{th}$ cycle refers to a ratio of the discharge capacity at the $10^{th}$ cycle to the discharge capacity at the $1^{st}$ cycle (Capacity retention rate at the $10^{th}$ cycle=Discharge capacity at the $10^{th}$ cycle/Discharge capacity at the $1^{st}$ cycle).

TABLE 4

|  | Initial discharge capacity [mAh/g] | Initial coulombic efficiency [%] | Capacity retention rate at $10^{th}$ cycle [%] |
| --- | --- | --- | --- |
| Example 2 | 1439 | 78.5 | 93 |
| Comparative Example 4 | 1073 | 62.6 | 15 |
| Comparative Example 5 | 1308 | 69.5 | 15 |
| Comparative Example 6 | 910 | 69.8 | 81 |

As can be seen in Table 4, the lithium battery of Example 2 had a markedly improved lifespan (capacity retention rate), as compared to the lithium batteries of Comparative Examples 4 and 5, and had a markedly increased initial discharging capacity, as compared to the lithium battery of Comparative Example 6. In addition, for the lithium battery of Example 2, the capacity density was maintained at 1000 mAh/g or greater, indicating a remarkable improvement over lithium batteries including only carbonaceous anode active materials.

As described above, according to the one or more of the above exemplary embodiments, a lithium battery including a composite anode active material that includes carbon nanotubes covalently bound to metal core particles has an excellent capacity retention rate.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A method of preparing a composite active material comprising:
    preparing a mixed solution by mixing metal core particles, carbon nanotubes and an organic solvent;
    milling the mixed solution to form a milled mixed solution; and
    drying the milled mixed solution to form a dried product; and
    sintering the dried product in an inert gas atmosphere to arrive at a composite active material that is free of carbonaceous material except for the carbon nanotubes,
    wherein the organic solvent is an alcohol.

2. The method of claim 1, wherein the amount of the carbon nanotubes in the mixed solution is from about 2% to about 20% by weight, based on the total weight of the metal core particles and the carbon nanotubes.

3. The method of claim 1, wherein the amount of oxygen in the organic solvent molecule is less than about 25% by weight, based on the total molecular weight of the organic solvent molecule.

4. The method of claim 1, wherein the organic solvent comprise a C4-C20 straight or branched alcohol.

5. The method of claim 1, wherein the sintering is performed at a temperature of from about 600° C. to about 1400° C.

* * * * *